(12) United States Patent
Nist

(10) Patent No.: US 6,662,788 B2
(45) Date of Patent: Dec. 16, 2003

(54) REMOTE METERING FOR GASEOUS FUELS AND OXIDIZERS

(76) Inventor: Lance E. Nist, 2824 S. Willis St., Santa Ana, CA (US) 92705

( * ) Notice: Subject to any disclaimer, the term of this patent is extended or adjusted under 35 U.S.C. 154(b) by 0 days.

(21) Appl. No.: 10/123,438

(22) Filed: Apr. 16, 2002

(65) Prior Publication Data

US 2003/0192513 A1 Oct. 16, 2003

(51) Int. Cl.⁷ .................... F02M 21/02; F02B 43/00; F02G 5/00
(52) U.S. Cl. .................. 123/525; 123/527; 123/557; 123/568.11; 123/549
(58) Field of Search .................. 123/525, 527, 123/549, 557, 568.11, 568.21

(56) References Cited

U.S. PATENT DOCUMENTS

| | | | |
|---|---|---|---|
| 3,540,419 A | * 11/1970 | Fox | 123/27 GE |
| 4,227,497 A | 10/1980 | Mathieson | |
| 4,351,303 A | * 9/1982 | Tierney | 123/568.32 |
| 4,369,751 A | 1/1983 | Batchelor et al. | |
| 4,545,356 A | * 10/1985 | Casey | 123/527 |
| 4,553,519 A | 11/1985 | Masson | |
| 4,694,802 A | 9/1987 | Lowi | |
| 4,858,583 A | * 8/1989 | Sonntag | 123/527 |
| 5,150,690 A | * 9/1992 | Carter et al. | 123/527 |
| 5,325,838 A | * 7/1994 | Bennett | 123/527 |
| 5,329,908 A | 7/1994 | Tarr | |
| 5,365,902 A | 11/1994 | Hsu | |
| 5,367,999 A | * 11/1994 | King et al. | 123/527 |
| 5,477,830 A | 12/1995 | Beck et al. | |
| 5,499,615 A | 3/1996 | Lawrence et al. | |
| 5,533,492 A | * 7/1996 | Willey et al. | 123/527 |
| 5,546,908 A | * 8/1996 | Stokes | 123/525 |
| 5,666,923 A | 9/1997 | Collier, Jr. et al. | |
| 5,711,270 A | 1/1998 | Pedersen | |
| 5,713,336 A | 2/1998 | King | |
| 5,740,782 A | 4/1998 | Lowi | |
| 5,752,489 A | 5/1998 | Henderson | |
| 5,758,865 A | 6/1998 | Casey | |
| 5,827,335 A | 10/1998 | Ward | |
| 5,890,459 A | 4/1999 | Hedrick | |
| 6,016,832 A | * 1/2000 | Vars et al. | 123/527 |
| 6,026,787 A | 2/2000 | Sun et al. | |
| 6,119,670 A | 9/2000 | Lavi | |
| 6,125,797 A | 10/2000 | Dupointe | |
| 6,145,495 A | 11/2000 | Whitcome | |
| 6,202,601 B1 | 3/2001 | Ouellette | |
| 6,289,881 B1 | * 9/2001 | Klopp | 123/525 |
| 6,505,612 B1 | * 1/2003 | Cipressi et al. | 123/527 |

* cited by examiner

*Primary Examiner*—Noah P. Kamen
(74) *Attorney, Agent, or Firm*—Fulwider Patton Lee & Utecht, LLP

(57) ABSTRACT

A separate metering and metering unit for a diesel and/or propane or similar gas/liquid fuel powered internal combustion engine such as a dual fueled engine incorporates an intake filter, a lockout solenoid, and a metering device into a single integrated unit remote of the carburetor of the engine. The metering unit includes a heater immediately adjacent to the output of the injector metering device in order to provide heat necessary to prevent any freezing of the unit injector or gaseous fuel or oxidizers downstream of the metering unit. The injection of the propane allows for correct operation of a catalytic converter.

46 Claims, 12 Drawing Sheets

REMOTE METERING FOR GASEOUS FUELS AND OXIDIZERS

BACKGROUND OF THE INVENTION

This invention relates to a remote metering unit for an engine that is powered by liquid gasoline, liquid diesel, compressed propane, natural or other gas. This invention also relates to an engine allowing for the use of two or more fuels and/or fuels and oxidizers at the same time. Correct calibration of the remote metering unit will also allow the operation of a catalytic converter, an inexpensive hydrocarbon type, on a diesel engine.

Compressed propane, natural and other gases are efficient fuels for providing for higher efficiency in powering engines. Such compressed gaseous fuels typically provide higher power at relatively low cost in a more reasonably environmentally friendly manner than liquid fuels alone. Advantages include lower wear on the cylinders and rings, cleaner burning and extended oil changes due to less oil consumption together with the dryness of the gas (and due to the fact that there is no oil wash off or dilution in the engine).

Engine components for gas distribution, such as vaporizers/converters, fuel filters, fuel lock off are typically mounted adjacent to each other for use on existing engines. However, such components do not provide a total overall solution for the control of the combustion engines powered by such gaseous fuels; additional components are still required for these units. In addition, conventional supply of gaseous fuels to engines can result in higher emissions when the engine is warm as well as additional pressurized gas and hot water hose connections that can leak. In some instances a dual fuel operation is provided (propane for inside operation; liquid gasoline for outside operation). This necessitates two separate paths within/without a single unit. Emission control problems also remain substantially unsolved without the use of downstream treatment by multiple element catalytic converters and filters. A need still exists for a universal external, unitary fuel and/or oxidizer metering pod for internal combustion engines which can reduce the complexity of gas vaporization, and which can be retrofitted to existing liquid fueled engines. It would be desirable to provide for a precisely controlled metering pod for a compressed gaseous fuel and/or oxidizer utilized with an internal combustion engine to provide for the precise, consistent and repeatable controlled metering of the compressed gaseous fuel and/or oxidizer. The present invention meets these and other needs.

SUMMARY OF THE INVENTION

Briefly, and in general terms, the present invention provides for a fuel and/or oxidizer metering apparatus for internal combustion engines to provide for precise control of metering of a compressed gaseous fuel and for metering of multiple fuels, including gases and liquids. The apparatus of the invention dramatically reduces the number of components required for a compressed gas dual fueled engine suitable for combustion; reduces the cost of providing for a vaporized fuel/gas system interconnected to an internal combustion engine; and provides for an integrated control for engines powered by a compressed gas. The apparatus of the invention will simplify and reduce the cost of pollution control related to internal combustion engines. This includes meeting existing and proposed governmental emission limits with add-on downstream exhaust gas treatment such as by one or more catalytic converters or filters. The apparatus of the invention can also lower the cost of retrofitting internal combustion engines for operation on compressed gas or refitting existing compressed gas operating engines with a new low emissions compressed gas system; increase the maintenance interval and emission compliant operating interval of the metering system and its components; and provides for a dramatically simplified, reliably and precisely controlled remote metering system for internal combustion engines. The present invention further allows the operation of a common, hydrocarbon based, catalytic converter to be efficient on a diesel cycle engine.

The invention accordingly provides for a metering unit for a compressed combustible gas from a source of the compressed liquid combustible gas for service with a gas powered unit. The metering unit includes a pod with an inlet passage and an outlet passage, with a sealed passage in the pod connecting the inlet passage to the outlet passage. The pod may be remote from the gas powered unit, and a pipe may be provided connecting the outlet passage of the pod to the powered unit. Means are provided to connect the inlet passage to the source of compressed liquid combustible gas both internal to the tank or external to the tank, and means are provided to connect the outlet passage to the gas powered unit for providing gas thereto. An injector metering device is also disposed in the sealed passage that selectively meters compressed gas through the inlet passage to the outlet passage. In one embodiment, a pressure sensor is provided for sensing the pressure of the compressed gas in the inlet passage, and the metering of the injector may be controlled in response to the pressure sensor. In another embodiment, the outlet passage has an outlet passage axis, the injector metering device has a jet axis, and the jet axis is aligned with the outlet passage axis. In one aspect, the inlet passage has an inlet passage axis, and the inlet passage axis is substantially perpendicular to the jet axis.

In another aspect, the invention provides for temperature control means to control the temperature of the pod. The temperature control means may include an electric heater selectively operated to heat the gas in the outlet passage. The temperature control means may also be operative to control operation of the injector metering device. A thermal switch may also located in the pod to control the electric heater.

In another aspect, in which the powered unit has a controllable parameter, a temperature sensor is provided for sensing the temperature of the outlet passage, and means are provided to control the parameter of the metering unit in response to the temperature sensor. In another aspect, the controllable parameter may be the temperature of the metering unit injector, and the means to control the parameter may be a heater providing heat to the metering unit injector. The controllable parameter may be a temperature of the compressed gas, and the means to control the parameter may be an electric heater providing heat to the compressed gas.

In another aspect, the powered unit has an intake manifold and exhaust manifold, and a pipe is provided between the exhaust manifold and the intake manifold to provide for exhaust gas recirculation. An air mixing unit may be disposed between the pod and the intake manifold, and a unit temperature sensor may also be provided for sensing a measure reflective of the metering of the gas in the intake manifold, with means to control the exhaust gas recirculation in response to the unit temperature sensor.

A sensor may also be provided for measuring a parameter of the powered unit and generating a parameter output signal representing a measurement of the parameter. An electronic processing unit receives the output signal and controls the injector responsive to the parameter output signal. In one aspect, the powered unit includes an exhaust gas recirculation valve for controlling exhaust gas recirculation, and the sensor controls the exhaust gas recirculation valve. The powered unit may also have an adjustable mechanical manual control of the exhaust gas recirculation valve. In one aspect, the sensor is an oxygen sensor disposed in an exhaust of the powered unit. Means may also be provided for heating gas in the outlet passage, and the sealed passage, the injector and the means for heating may be integrated into the pod. A pressure regulator may also be connected to the sealed passage for regulating the pressure of the compressed gas.

A filter may be provided in the sealed passage of the pod between the inlet passage and the injector metering device, and means may be provided for cycling of the filter.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
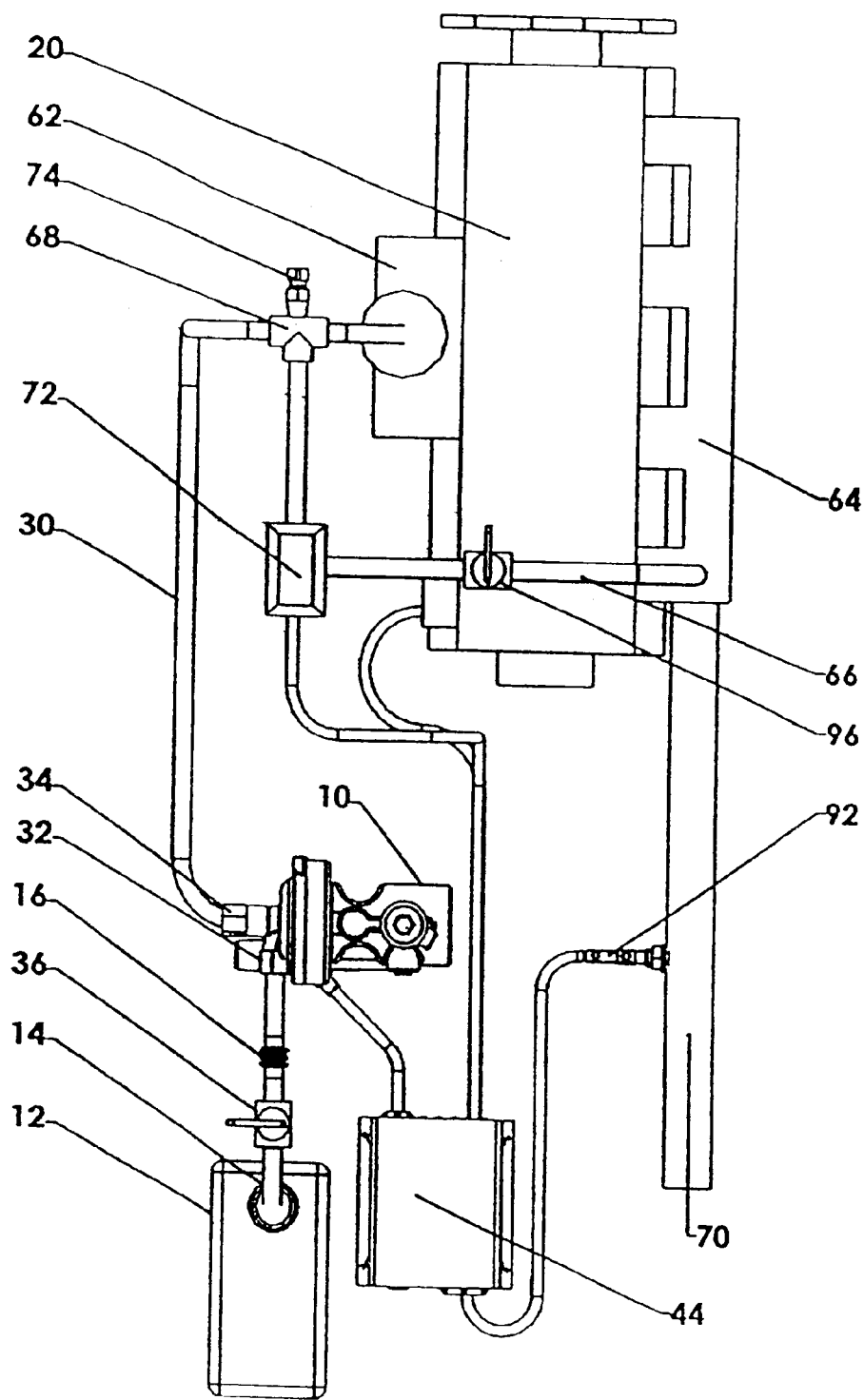
FIG. 1 is a top plan of the system employing the invention of the application.

As is illustrated in the drawings, the invention is embodied in a metering unit 10, shown in FIG. 1, for a compressed liquid combustible gas and/or fuel oxidizer from a source 12 of compressed liquid combustible gas and/or fuel oxidizer, such as a gas cylinder or tank, carried via a pipe 14, having one or more flexible connections 16, to a gas powered unit 20. Referring to the FIGS. 2–6, the metering unit includes a main body or metering pod 22, with an inlet passage 24 in the end cover 124 of the pod, an outlet passage 26, and as is shown in FIG. 3, a sealed passage 28 in the pod connecting the inlet passage to the outlet passage. Referring again to FIG. 1, the pod may be disposed in a location remote from the gas powered unit, and may have a pipe 30 connecting the outlet passage of the pod to the powered unit. A connector means 32 connects the inlet passage to the source of compressed liquid combustible gas, and a connector means 34 connects the outlet passage to the gas powered unit for providing gas thereto. A shutoff valve 36 can also be included on the hose or pipe, or on the pod in order to allow for the shutoff of the gas.

Referring to FIGS. 2–6, the metering unit includes an injector metering device 40 disposed in the sealed passage, a pressure sensor 42 for sensing the pressure of the compressed gas in the inlet passage, and as is shown in FIG. 1, means 44 to control the metering of the injector in response to the pressure sensor, such as an electronic processing unit or ECU, to be described below.

Referring to FIG. 3, the outlet passage has an outlet passage axis 50, and the injector metering device has a jet axis 52, and the jet axis is preferably aligned with the outlet passage axis. The inlet passage also has an inlet passage axis 54, which is preferably substantially perpendicular to the jet axis.

Figure 4:
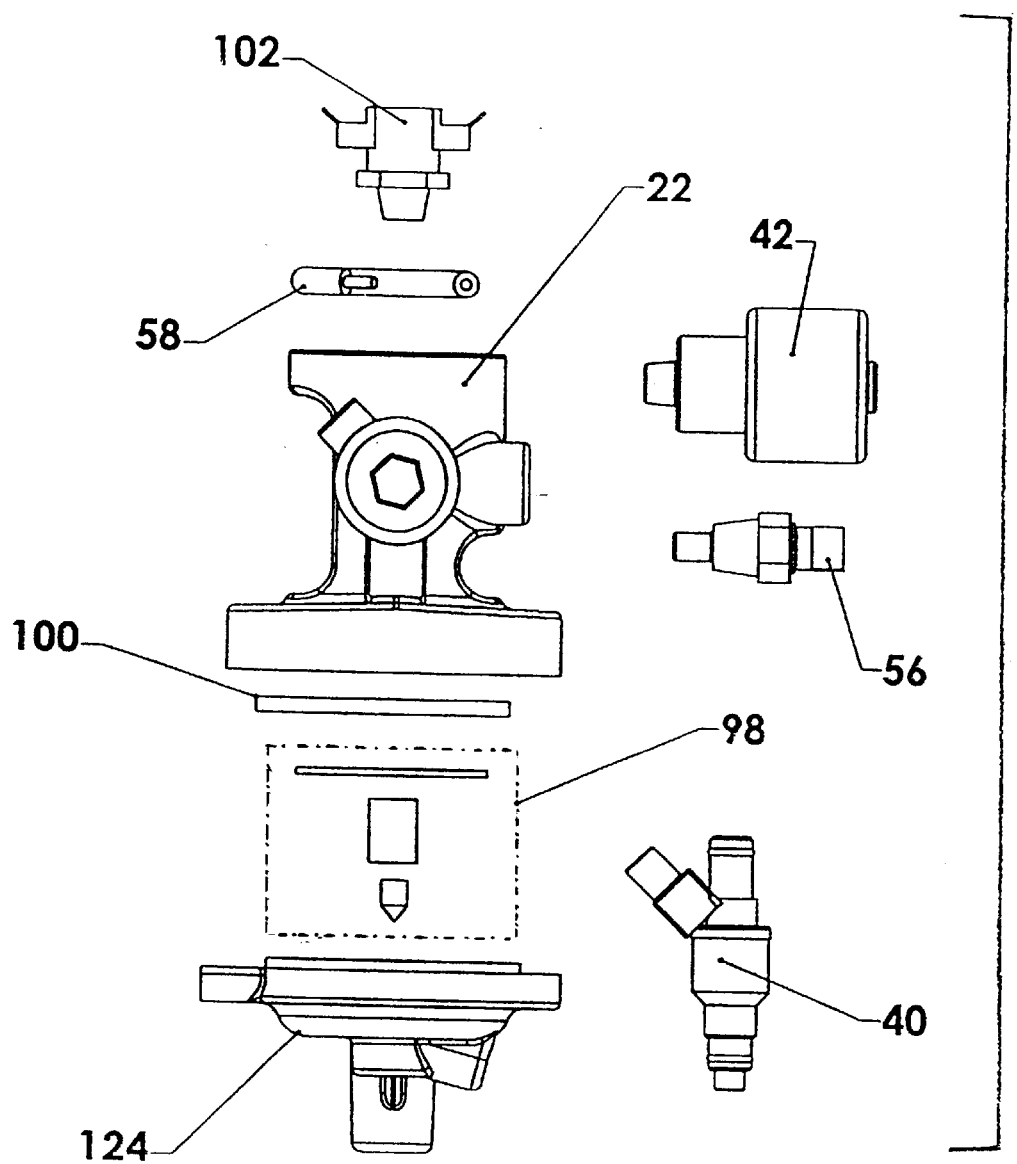
FIG. 4 is an exploded top view of the metering pod of FIG. 2.
Figure 5:
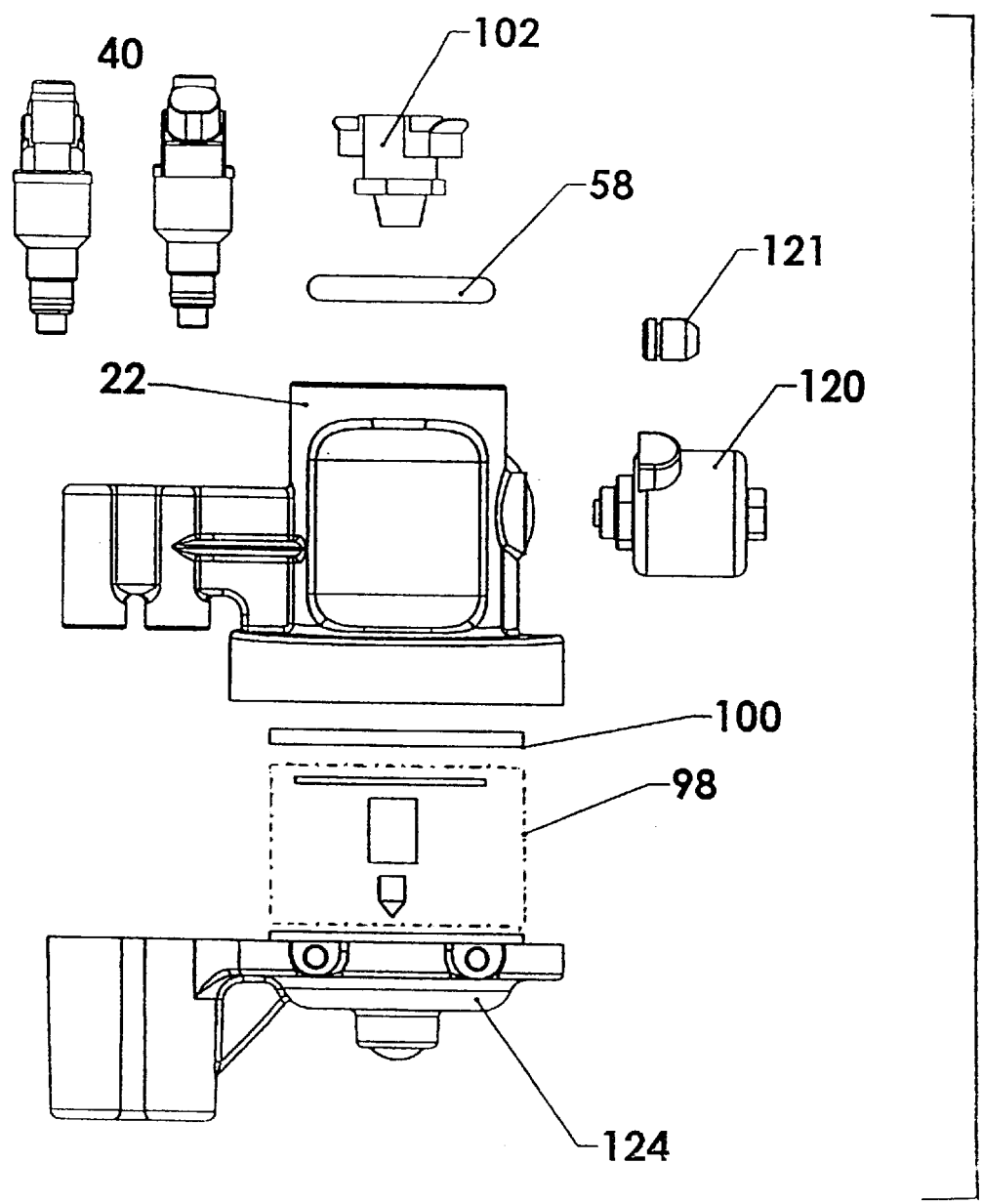
FIG. 5 is an exploded side view of the metering pod of FIG. 2.

With reference to FIG. 4, a means for controlling temperature, such as a temperature sensor 56, for example is provided, to control the temperature of the pod, and to provide temperature information to be sent to the ECU. This allows the ECU to then shut off the system or modify the pulse train to the unit injector 40. A means for heating, such as the heater 58 for example, may also be provided for heating gas in the outlet passage. The heater may be an electric heater that is selectively operated to heat the gas in the outlet passage. The metering unit may further include a thermal switch 102 located in the pod, for controlling the electric heater. This allows further safety control and provides the ability to heat the pod with or without control from the ECU.

Again referring to FIG. 1, the powered unit includes an intake manifold 62 and exhaust manifold 64, with a pipe 66 connected between the exhaust manifold and the intake manifold to provide for recirculation of gas from the exhaust 70. An air mixing unit 68 may also be disposed between the pod and the intake manifold. Valve means 72 are also preferably provided to control the exhaust gas recirculation passage 66.

The metering unit may also include a unit temperature sensor 74 for sensing a measure reflective of the metering of the gas in the intake manifold, and valve means 72 may be used to control the amount of exhaust gas recirculation in response to the unit temperature sensor.

Referring to FIG. 1, a sensor 92 may also be provided for measuring a parameter of the powered unit and generating a parameter output signal directed to the ECU 44 representing a measurement of the parameter. The sensor 92 may be an oxygen sensor, for example, disposed in the exhaust 70 of the powered unit for sensing an oxygen concentration in the exhaust.

As noted, above, the metering unit further includes an electronic processing unit or ECU 44 receiving the output signal and controlling the injector responsive to the parameter output signal. The ECU can be used to control the operation of the exhaust gas recirculation valve 72 in response to input from the sensor 92. An adjustable mechanical manual control 96 may also be provided for controlling the exhaust gas recirculation valve.

With reference to FIG. 4, the metering unit may also include a pressure regulator 98 connected to the sealed passage for regulating the compressed gas, and a filter 100 may be provided in the sealed passage of the pod between the inlet passage and the injector metering device for filtering the gas.

Again referring to FIG. 1, in addition, a control means such as the valve means 72 discussed above may be provided to control a controllable parameter in response to sensed temperature from the temperature sensor 74. Alternatively or in addition, the control means may include a heating or cooling means such as the mixer 68 providing heat to the outlet passage gas, or may be a cooling means 68 to cool the recycled exhaust gas.

The metering unit is preferably a simple, unitary pod providing multiple functions, in the embodiment disclosed filtering, pressure regulation, shutoff, metering, compensating heat, switching, and the like. By incorporating all of these functions into an integral pod, ease of installation, use and repair is assured, both in original manufacture and retrofit applications. Furthermore, the parts of the pod can be utilized across entire product lines with a minimum of additional engineering, thus increasing the efficiency of utilization. The unitary pod can be located remotely of the remainder of the engine operational components. The integration of the metering unit significantly reduces the number of parts and complexity of control versus other metering units. This simplifies any given installation as well as increasing the number of possible installations. In addition the location of the preferred pod is not critical, thus even further increasing the flexibility of the pod.

This metering unit precisely controls the metering of a compressed gas or gasses from a source of compressed gas directly to an internal combustion engine, turbine, fuel cell or other unit powered thereby. The device itself can be under control of an electronic control unit. The source of compressed gas is a reservoir of pressurized gas, may be in a liquid form due to the ambient temperature and commercial filling pressure. This provides the combustible fuel gas for the powered unit. Compressed and/or liquefied propane, natural gas, hydrogen and other such fuel gases can be used in the device. Oxidizers, such as nitrous oxide, oxygen, or other such gasses may also be metered in a safe and separate manner within the same metering pod.

The compressed gas may be liquid propane, for example, enclosed within a tank or cylinder ordinarily containing 70 pounds of liquid propane. This tank is removable connected through a flexible hose or pipe to the metering unit. The hose or pipe typically has a commercially universal removable fitting with the tank to allow for the in stationary filling of the tank or replacement or exchange of a depleted tank with a full one.

A filter is located in the metering pod provides for the interception of any contaminants contained in the gas and/or occasioned by the exchange or refilling thereof of the tank. A shutoff valve can also be included on the hose or pipe, or on the pod in order to allow for the shutoff of the gas. This valve's primary function is to totally shutoff the gas to the subsequent system elements whenever electrical power to the remainder of the device including engine is shut off or otherwise interrupted. This allows for the separation of liquid or gas from subsequent components. This facilitates operation of these components by reducing the demands thereon as well as maintenance. The section of the hose or pipe leading from the tank contains at least one flexible section (such as rubber or synthetic material or corrugated walls) so as to allow for the vibration of the tank (and of the metering unit) in respect to pipe, thus reducing the possibility of vibration induced damage or separation thereof.

The powered unit takes the gas from the source and utilizes it as a fuel to provide for a secondary form of power, direct or indirect, be it mechanical, electrical or otherwise.

Due to the fact that the disclosed metering unit provides precisely metered gas to the powered unit, there is no requirement for a separate dry gas metering barrel valve or other dry gas control valve means, external heat exchanger (for metering of the liquid fuel), two stage regulation, heating water hoses and other secondary units.

In the embodiment disclosed, the powered unit is an internal combustion engine of one or more tanks operating on the two stroke, four stroke (Otto), two stroke (diesel), four stroke (diesel), other stroke (6 or 8 in a camless engine for example), miller cycle or the like.

The electronic processing and control unit (ECU) cooperate with at least the pod unit with the gas from the metering unit, and with the engine demands so as to provide for synergistic operation.

In most existing applications, RPM sensing electrically interconnected to the engine unit to adjust the volume of fuel gas. This ECU unit may optionally include inputs such as a temperature sensor, a pressure sensor for the tank, a coolant temperature sensor, an exhaust oxygen content sensor, a combustion gas ionization sensor, inlet manifold pressure sensor, a mass airflow sensor, a throttle control position sensor, an engine speed sensor, or other feedback to and from the pod or engine.

In the simplest embodiment of this invention the ECU unit can operate a gaseous, solenoid metering valve, latching metering valve, liner metering valve, or other pulse width modulated device.

Figure 9:
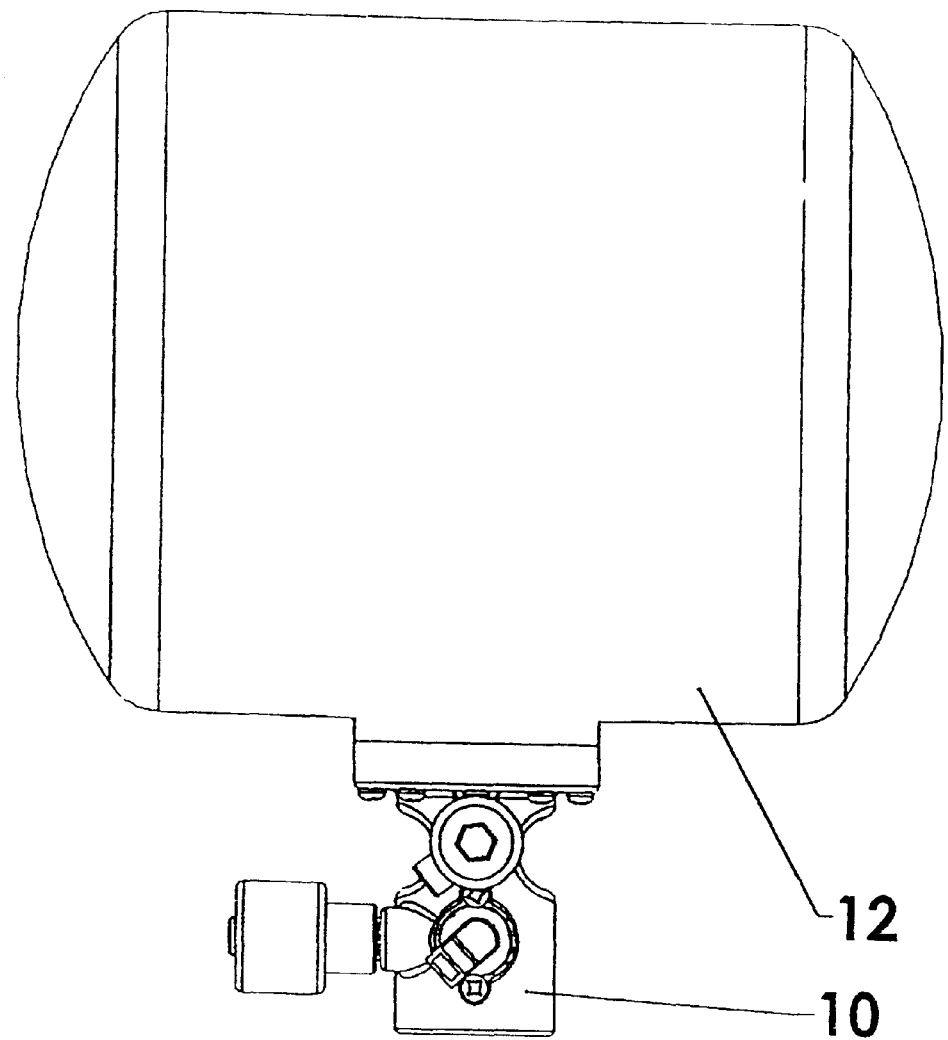
FIG. 9 is a view of a gas tank with an integral metering pod, with external mounting of the metering pod.
Figure 10:
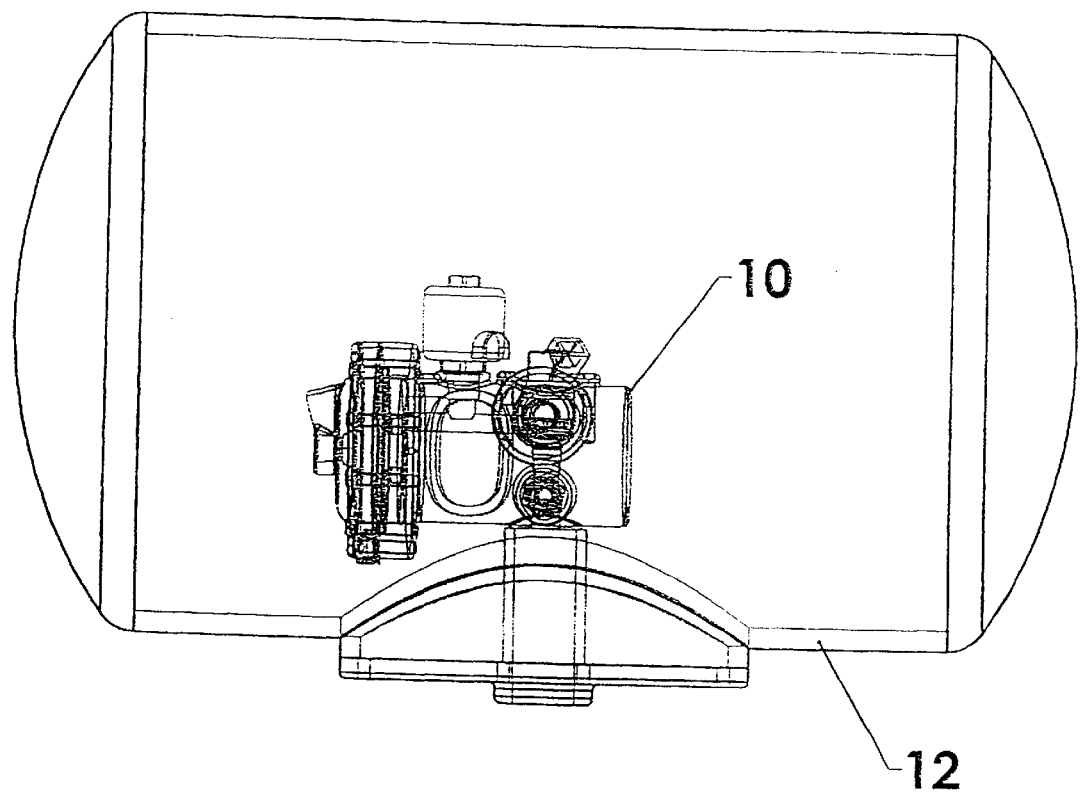
FIG. 10 is a view of a gas tank with an integral metering pod, with internal mounting of the metering pod.
Figure 11:
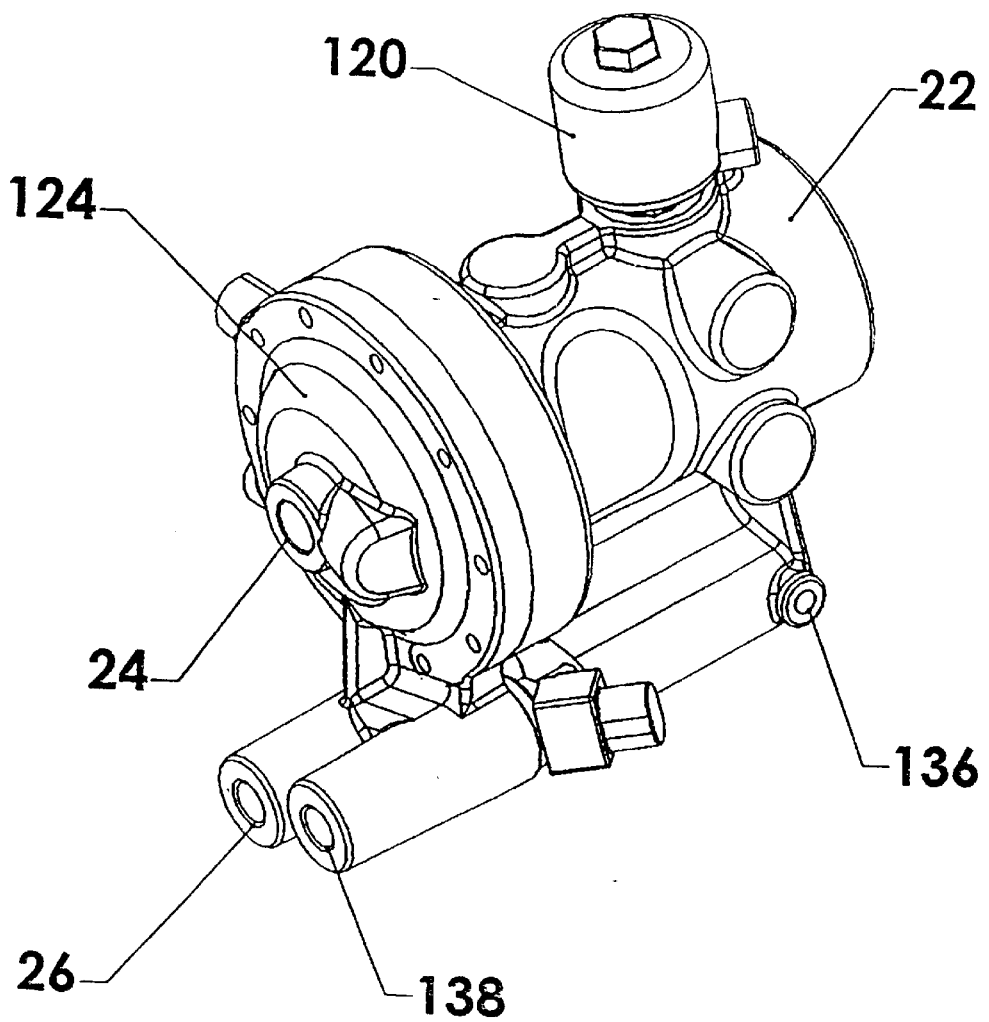
FIG. 11 is a view of a metering pod for metering two different fuels and/or oxidizers at the same time within one metering pod.

The invention relates to the incorporation of a self-contained metering unit between the source of compressed gas and the powered unit. The metering unit takes the compressed inflammable gas from the tank to provide for its metering suitable for fuel for the powered unit with a correct gas to air ratio. The preferred pod is a unitary unit containing a filter, pressure regulator, remote lockout, injector, pressure sensor(s), heater and thermal switch. Referring to FIGS. 9 and 10, the pod can be mounted remotely or directly to the tank, both internal or external of the tank. Further, due to the ease of mounting or removal of these parts on a single casting, those parts not needed for a particular application can be eliminated (with appropriate plugs if necessary) and those parts that are defective can be repaired without compromise to the remainder of the installation. Parts can also be utilized in multiples if desired (for example multiple injectors for increased metering or metering volume). Additional examples a base line heater for continuous operation with a supplemental heater for above base line heat. In addition, the outputs from the pod (for example the temperature sensor) and inputs to the pod (for example injector timing) can be utilized by the ECU in the control of other devices.

In one embodiment, the invention contains only one moving part (the metering unit valve), in contrast to an average of perhaps 15 moving parts in a conventional system. The ECU itself includes a remote pod having an inlet, a filter, a metering device and an outlet.

The pod forms the body of the control unit. This body provides a sealed passage for the gas passing from the inlet to the outlet in addition to providing a physical mounting means for the components of the control unit.

The pod disclosed in the preferred embodiment also provides a heat mass to absorb and transfer temperature changes in the metering process.

The particular pod shown in the figures is a generally polymer or cylindrical metal (brass or aluminum) object incorporating a pressure regulator, a filter cavity, an inlet passage flow path, and an output gas passage. The pod itself can be located almost anywhere between the source of compressed liquid or gas fuel and the powered unit. This may include locations remote from both as well as being integrated with either; due to the integral independent means of gas heating in the pod its location is not critical. Note, however, that the location of the pod may entail different control strategies in the operation of the heater element. For example, a location in a cold climate would change the temperature curve, as would a location closer to the tank and/or more remote from the engine. In addition, other matters may be affected. For example, the location and the distance between the pod and engine.

The optional filter cavity is for containing a replaceable filter element so as to remove incoming contaminants from the gas upstream of the later described metering device.

Figure 6:
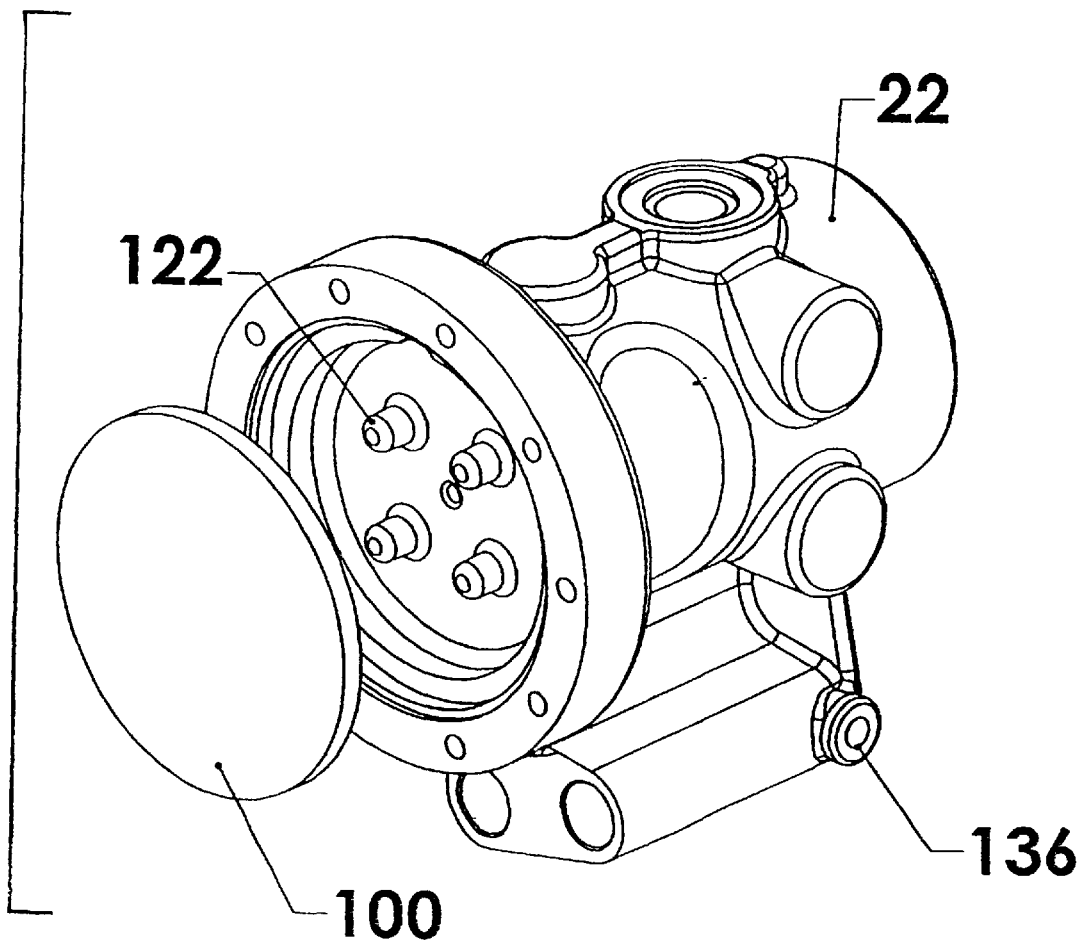
FIG. 6 is a perspective view of the metering pod body of FIG. 2.

In the embodiment disclosed, a filter is integral with the pod. This filter is preferably oversized. This allows for a longer service life than otherwise while also aiding in the gas distribution process. Further a single size filter can be utilized with differing capacity pods (as later described) thus reducing inventory or maintenance costs. Referring to FIG. 6, physical supports, (four are shown) 122 extending off of the pod shown immediately adjacent to the filter downstream thereof help to physically support the filter against the flow of the incoming liquid gas in addition to eliminating the straight laminar flow through a limited portion of the filter (which might otherwise occur). This is aided by the location of the entrance to the inlet gas passage near the outer circumference of the cavity, a location that pulls the gas across the face of the filter (utilization of this filter can be in addition to or in lieu of tank filter for a stand-alone unit). An optional inlet pressure regulator located adjacent to the filter, in the pod upstream of the filter, allows constant pressure across the metering device.

The inlet gas passage serves to transfer the gas within the pod from the inlet to the metering device. In the embodiment disclosed, the passage is a sealed passage including additional components upstream of the metering device. These include, in addition to the aforementioned filter, an automatic lockout valve, a pressure sensor and a temperature sensor. Since the control unit ECU utilizes the latent pressure within the tank, no additional high pressure producing or fluid transfer pump needs to be utilized in the preferred embodiment disclosed. The energy used to compress and liquefy the gas or filling the storage tank is utilized.

A connector is used to provide a connection between the pod and the fuel delivery hose to allow the feed hose to be connected to and separated from the pod. This also facilitates access the filter for service maintenance. Preferably somewhere on the hose between the tank and the pod of the control unit there is a flexible connection (preferably at least two) so as to allow for the independent movement of these components in respect to each other (and in respect to any common unit to which they may be mounted). This flexibility ameliorates possible vibration matters.

Figure 2:
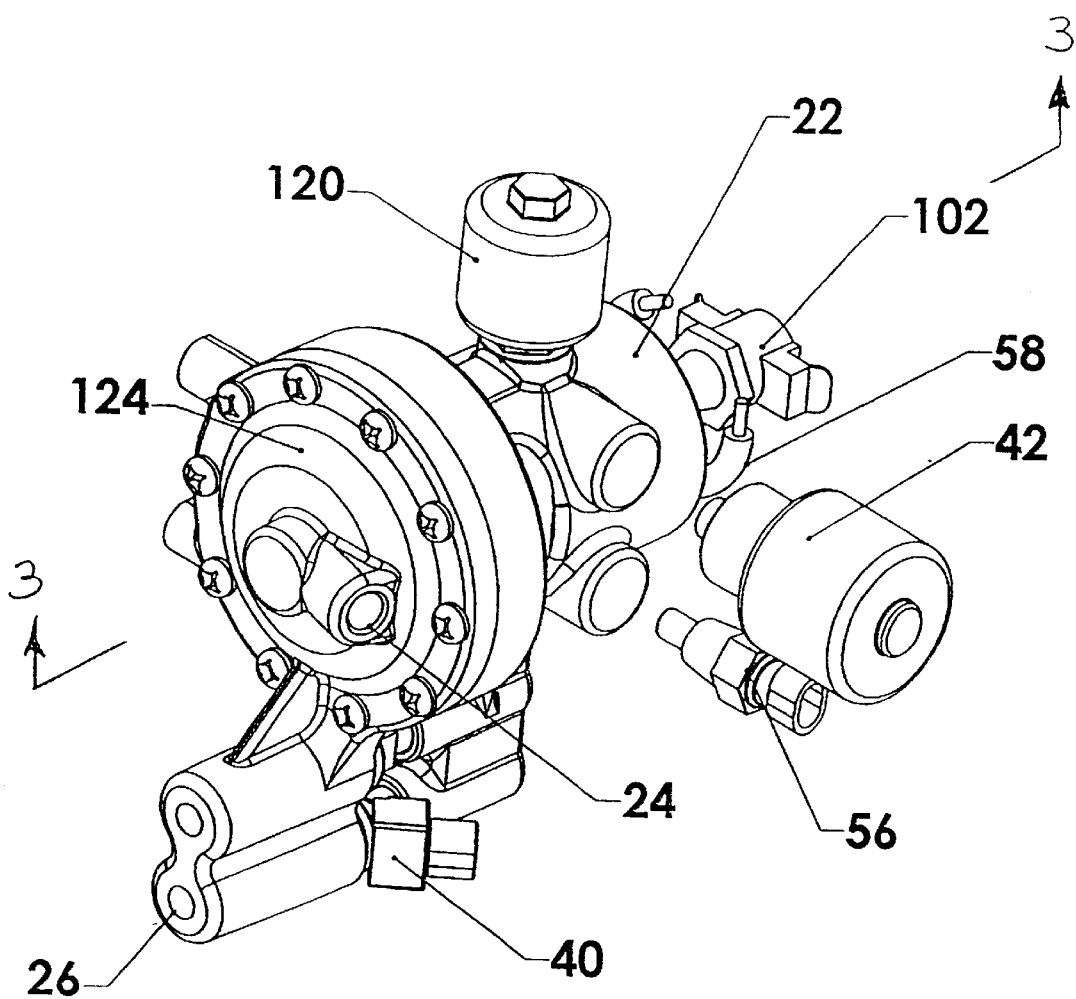
FIG. 2 is a perspective view of the metering pod of FIG. 1.
Figure 3:
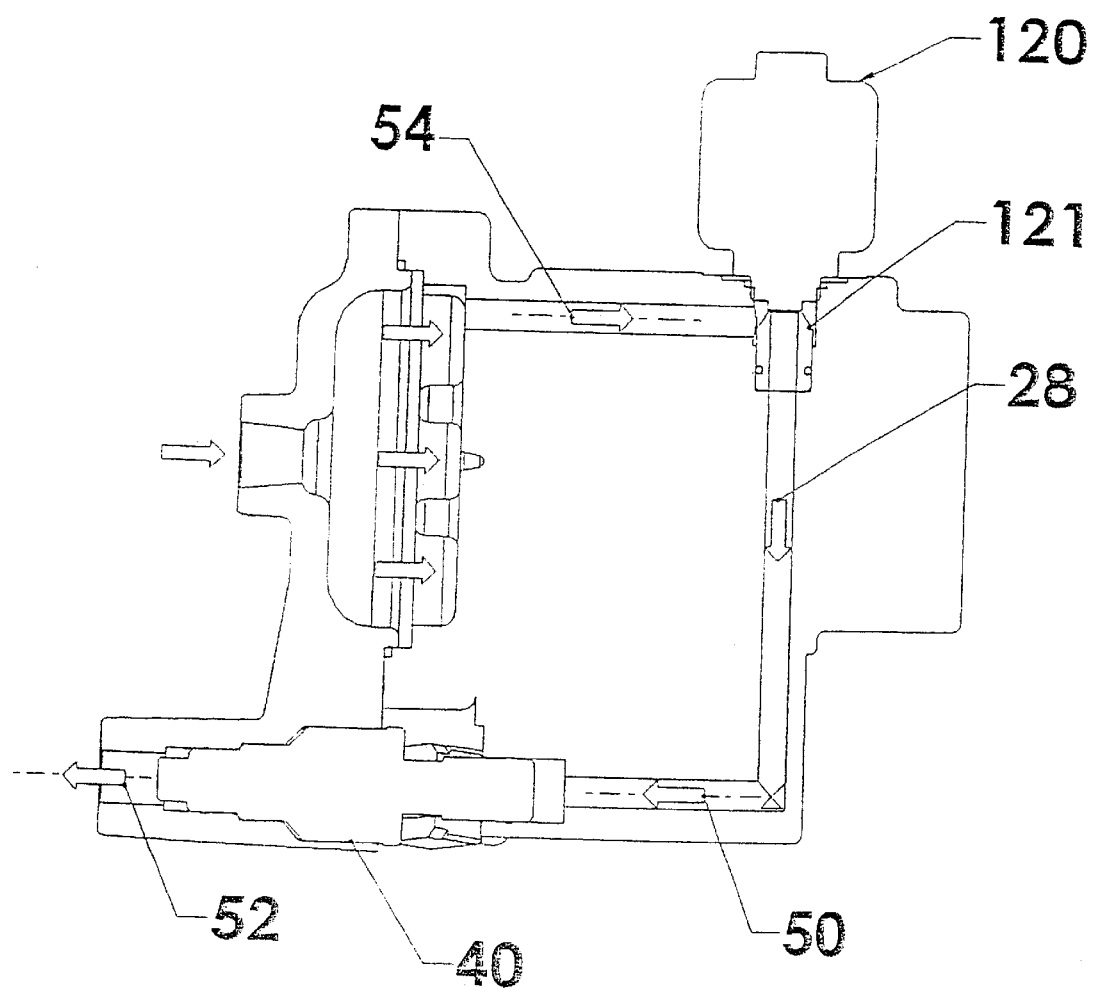
FIG. 3 is a lateral cross-sectional view of the body of the metering pod, taken along line 3—3 of FIG. 2.

The lockout valve 120 shown in FIGS. 2 and 3 positively interrupts the passage of gas in the passage so as to prevent any gas from passing between the tank to the metering device downstream thereof. The lockout valve 120 disclosed is an electrically operated solenoid valve that is spring biased into a closed condition. On receipt of an electrical signal the solenoid valve operates to automatically open, thus allowing for passage of liquid gas to the metering device. Preferably this signal is concurrent with the operation of the powered unit such that when the powered unit is on, the valve is automatically open (and conversely, if the electrical power is shut off by the operator or otherwise interrupted, intentionally or not, the valve is closed by the spring incorporated therein).

While in the embodiment disclosed, the lockout valve is a solenoid operated piston element positively moveable to allow the flow of gas there through, other forms of lockout valves such as rotary valves, diaphragm valves or other selectively operable shutoff units could be utilized. Referring to FIG. 3, the removable seat 121 allows for replacement of the sealing surface in the pod itself.

In an alternate embodiment, an optional pressure regulator can be provided to regulate the pressure of the tank. This provides for an additional measurement without connecting to the ECU. The optional pressure sensor provides a signal to the electronic processing unit. This measurement allows the maintenance of a predictable pressure differential across the injector. The preferred sensor allows for the ECU to compensate for any changes (up or down) in the incoming gas fed to the injector. This facilitates consistency of operation over time irrespective of major changes (like a depressurized tank) and even subtle changes (like a clogging filter). In the preferred embodiment disclosed the pressure sensor is located in an flow path connecting to the metering device. This provides a true measure of the pressure at a location immediately adjacent thereto.

The metering device meters the compressed gas in the intake passage to a dry gas within the output passage. A presently preferred injector device is an electro-mechanical injector, which provides this function by repetitively opening and shutting a mechanical valve leading to an injection jet immediately adjacent to (and axially in line with) the outlet gas passage. The fact that the injector is adjacent to the output of the pod reduces the possibility of freeze up within the pod. The fact that the injector is in line with the passage eliminates surfaces on which freeze up can build. This is facilitated by the fact that any gas directional change in the pod occurs and thus amenable to easy routing changes. This allows for the easy installation and removal of the injector.

In the device disclosed, the injection is provided by pulse width modulation (time of valve opening) under control of the ECU. Other signals could be utilized such as pulse density modulation, pulse coding modulation, and the like, as appropriate. Pulse width modulation is selected so as to reduce the number of on/off cycles of the disclosed solenoid per given time of operation. The metering device thus provides for a precisely controlled, constant and even flow of gases through the outlet of the device to the air control, air to fuel-mixing, or engine inlet of the powered unit.

A temperature sensor located immediately upstream of the metering device senses the temperature of the gaseous fuel in the outlet passage. This serves as an input into the ECU for a control element of the metering device. The temperature sensor provides for a temperature and time control relative to the device. Preferably, this temperature sensor is a direct sensor in or very close to the gas. This provides for the most accurate monitoring of the liquid gas. The sensor may be indirect (for example, within the pod or injector), or theoretical (for example, responding to the number or timing of the injection or a measure of pressure or oxygen content in the exhaust stream of the powered unit). The temperature sensor may also be utilized otherwise such as in the control of the heat as later described.

Preferably a heater which is a source of primary heat is located in association with the metering device in the pod so as to provide heat to raise the operating temperature, in order to reduce manifestations including the possibility of freeze up of the control unit. Most of these manifestations occur during metering of the compressed liquid to the gaseous state. The heat is provided to compensate for these possibilities. The heater is preferably controlled by the input from a pod temperature sensor. Although this control could be an additional function for the temperature sensor previously described, a separate sensor unit is utilized in the preferred embodiment herein.

It is preferred that the heater provides heat input at the point in the pod adjacent of the gas or fluid jet. The reason for this location is that this is the area that is most likely to be subject to freeze up and icing during the operation of the metering function of the control unit. Note that the heater preferably provides heat during the entire continuing operation of the powered unit. This allows for a consistent operation. Note also that this preferred heat system is somewhat independent of pod location because the pod automatically compensates for temperature by utilizing engine temperature independent control strategies for heater operating.

The actual source of heat can be modified for the particular application of the pod. For example in a preferred embodiment the heater is a plug-in electrical resistance heating element having an on/off thermal switch. This facilitates the universality of the pod for a multiplicity of applications by providing a heating element amenable to differing control parameters, and that is thus a non-specific heater. However, in another embodiment two heaters may be utilized, one constant non-controlled beater with a supplemental variable heater controlled by a sensor (for example in a low constant speed generator the uncontrolled heater would provide the theoretical heat needed for continuous operation while the other would be applicable for cold startup or overload operations). This latter type of heater would be particularly suitable for engine block or coolant type heating for continuous operation. The heater could therefore be modified as appropriate for a given application.

Referring to FIG. 4, in the embodiment disclosed, the heater 58 is an electrically operated U-shaped heater located in the end of the pod near to the gas outlet passage. As the body of the pod is metal, the heat from the heater heats the walls of the outlet passage (as well as any liquid in the intake passage). This, together with the thermal mass of the body of the pod, provides for a more consistent level of operation than would occur if heat were provided only at the area immediately at the point of the release of the vaporized gas from the metering device in a pod without thermal mass. It also reduces quick cycling interference between any temperature switch or sensor and the heater. The consistent operation allows for the design to be optimized for a predictable power output, pollution control and other attributes both in theory and in practical operation.

The preferred heater shown, being physically connected to a thermal mass, could be switched on before operational fuel metering. This control is reactive to reaching a certain temperature. An example of heater control strategy would be to turn on the heater predictably (for example based on engine mapping, speed of temperature drop, amount of injector cycling, and the like) and not reactively. However, in practice, the purpose of the heater is to compensate for heat losses in the gas stream due to metering which heat losses would not otherwise be ameliorated in the given installation subsequent to the pod. Therefore, it is sufficient that any liquid gas is vaporized without uncontrolled temperature manifestations (like freeze up) between the injector and the powered unit.

In any strategy of operation the temperature loss due to compressed liquid into gas is overcome by the reserve of additional heat input available from the heater. This allows the metering unit to operate in a continuous manner irrespective of its location, orientation and/or the ambient temperature (including proximity to the engine). The length of the piping between the outlet of the pod and the mixing unit allows for a measure of gas temperature and dispersal equalization therein. The heater provides the rest.

The use of exhaust gas recirculation for providing supplemental heat dilutes the charge combustion gas by displacing intake volume with recalculated exhaust prior to being fed into the cylinders of the engine. This has the additional advantage that the pollution emissions of the engine are sufficiently controllable that it is possible to meet future pollution standards with the use of a catalytic converter.

In respect to design, it is not necessary to incorporate the catalytic parameters into the specific design of the powered unit (e.g., greater cooling, increases air flow, special catalytic exhaust manifold, engine operating speeds, temperatures, auxiliary air and heat, etc.). The powered unit can thus remain a relatively simple design.

Referring to FIG. 1, in the embodiment disclosed, the amount of exhaust gas recirculation is under the control of a manifold temperature sensor 74. The manifold temperature sensor is located in the intake manifold to sense the temperature of the fuel to air mixture therein, and preferably downstream of the mixing unit. Preferably, this manifold temperature sensor is a direct sensor in or very close to the mixture. This provides for the most accurate monitoring of the temperature thereof. The manifold temperature sensor could be indirect (for example embedded into the walls of the mixing unit or manifold) or theoretical (for example responding to throttle positioning or movement). While the manifold temperature sensor can have direct mechanical control of the exhaust gas recirculation valve (such as via a bimetal strip that flexes due to temperature changes), an indirect control as described herein is preferred.

It is preferred that an exhaust gas recirculation valve responsive to the manifold temperature sensor provides heat input at the point in the engine manifold adjacent to the engine inlet. This use of exhaust gas recirculation can be independent because the pod exhaust gas recirculation valve or sensor inherently compensates for temperature by utilizing relatively independent control strategies for operations.

The actual source of this exhaust gas recirculation can be modified for the particular application. For example in the embodiment of FIG. 1, the exhaust gas recirculation has an electrically controlled or mechanically activated gas valve to provide heat in response to a manifold temperature sensor. This facilitates the universality of the pod for a multiplicity of applications by providing non-specific exhaust gas recirculation (mainly the control parameters of electric exhaust gas recirculation valve need be changed for differing applications). In other applications, other types of exhaust gas recirculation could be utilized (for example a set size pipe in a specific constant speed or constant load generator installation).

In the embodiment disclosed, the exhaust gas recirculation has an electrically controlled or mechanically activated passage located leading to the intake manifold between the mixing unit and the engine.

Due to the electrical control, it is possible for the exhaust gas recirculation valve to be reliably activated in a consistent manner via a single relatively low manifold temperature sensor. This manifold temperature sensor then controls the operation of an electrically operated exhaust gas recirculation valve, which valve itself selectively provides a vacuum from the flow of gas into the engine. This provides a more consistent level of operation than would otherwise be possible. It also provides for relatively engine temperature insensitive operation.

A preferred exhaust gas recirculation valve is a high temperature valve. This necessary in order to process the exhaust gases passing there through. It is preferred that this valve be a gas pressure operated diaphragm exhaust gas recirculation valve. In this valve, a gas pressure of the output passage selectively applied to the input exhaust gas recirculation of the valve will modulate a sealed diaphragm connected to the actual exhaust gas recirculation valve. This allows for the control of the high temperature exhaust gases at a location remote of the actual recirculation valve. Further, it allows this to be accomplished with a relatively inexpensive component (in contrast with a comparable high temperature integral electrical valve).

In addition to the above, due to the electrical control, the exhaust gas recirculation valve can be switched on or otherwise manipulated without consideration for the thermal inertia (which might otherwise be necessary to overcome a purely mechanical exhaust gas recirculation valve such as that which would be provided by a bimetal strip or other mechanical type component). Therefore, the operation of the device can be controlled predictably (for example based on engine mapping) and not reactively.

Other sensors (such as a lambda oxygen sensor in the exhaust system of the engine) could further be integrated into the overall operation of the device.

The ECU controls the operation of the metering unit. The primary function of this electronic processing unit is to control the gaseous fuel discharged by the metering device. In addition in some embodiments the ECU controls the additional heat to the gas at/or adjacent the metering device downstream between it and the powered unit so as to provide power to operate the exhaust gas recirculation valve.

In respect to the control of the gaseous fuel, the electronic processing unit operates to meter the gas through the pod on a measure reflective of the volume of fuel necessary for operation exhaust gas recirculation unit. Specifically, the amount necessary to pass through the mixing unit for the desired output from the powered unit in the most fuel-efficient method consistent with any applicable exhaust gas emission limitations. An ECU can be reprogrammed to meter or control differing natures or types of gas by changing the amount passing form the pod to the metering unit. This allows for a single design to be utilized for example with differing gases without the necessity of pod modification. This increases the versatility of a given pod.

In respect to controlling the additional heat, the electronic processing unit can operate to control the heater and the exhaust gas recirculation to retain the vaporized state of the gas (and provide the non-freeze up or low pollution) as set forth herein.

Figure 7:
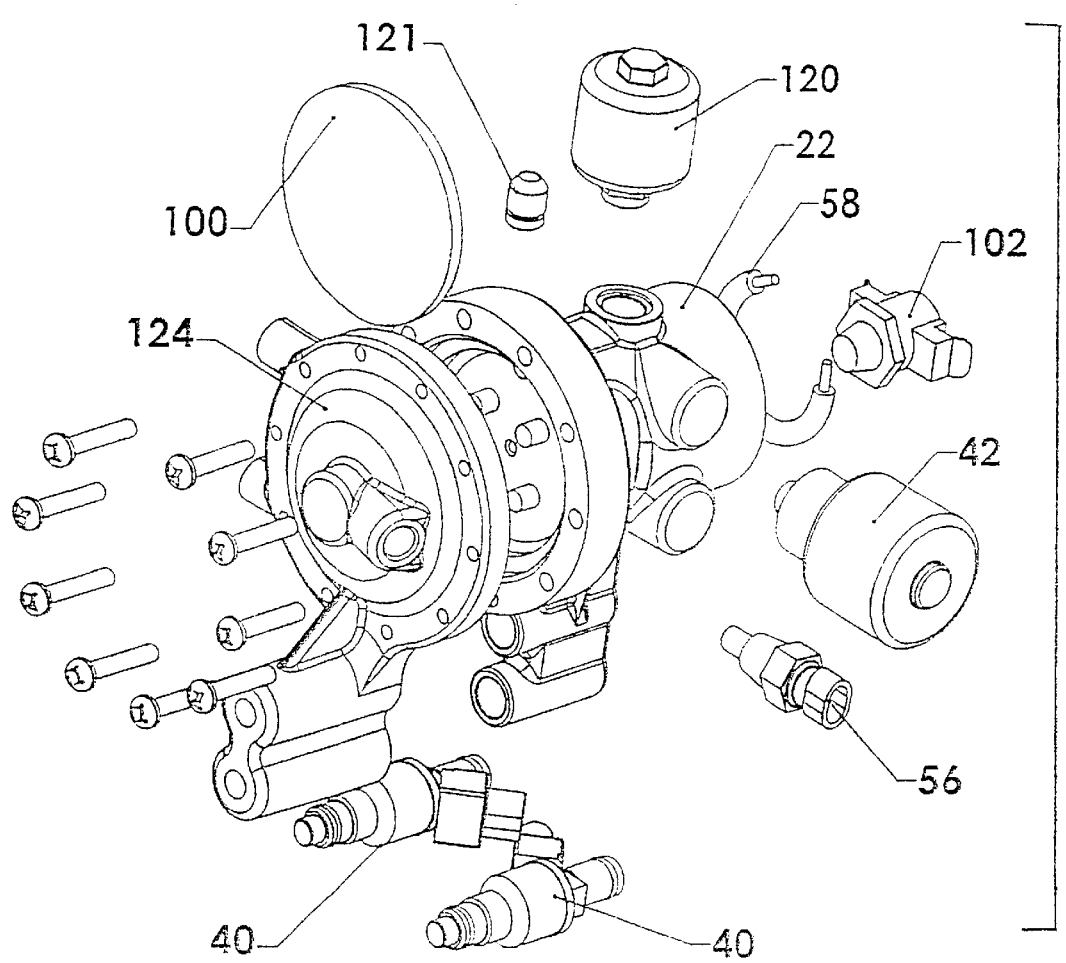
FIG. 7 Is an exploded view of a dual injector pod with integrated engine controls.
Figure 8:
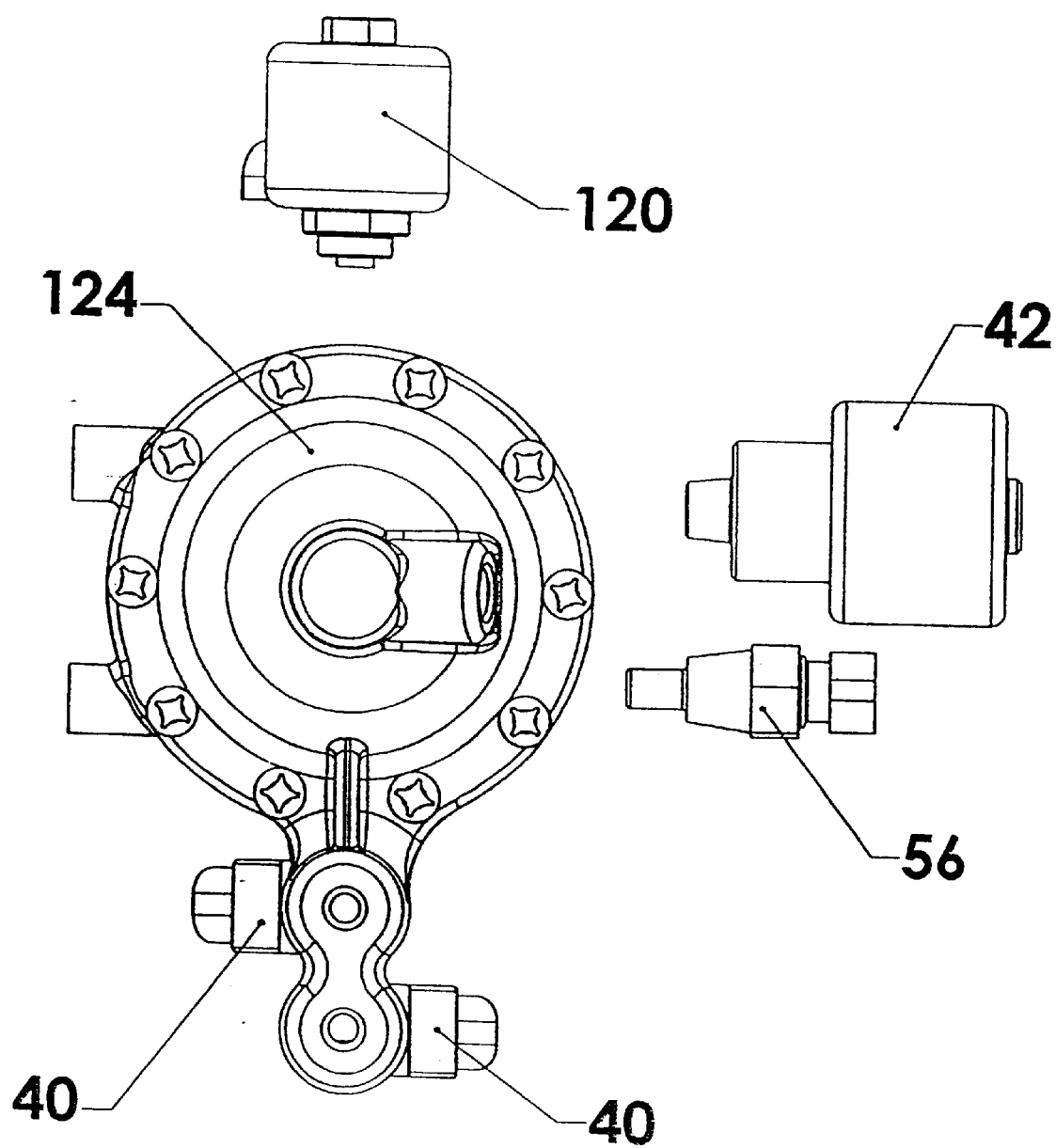
FIG. 8 is a view the end cover of the metering pod.

Although the invention has been described in its preferred form with a certain degree of particularity, it is to be understood that numerous operating strategy and/or control device changes can be made without functionally and/or operationally deviating from the invention as herein after claimed. For example, if desired, multiple pods (or multiple injectors in a single pod 40, as shown in FIG. 7, can be utilized for a given powered unit(s).

Figure 12:
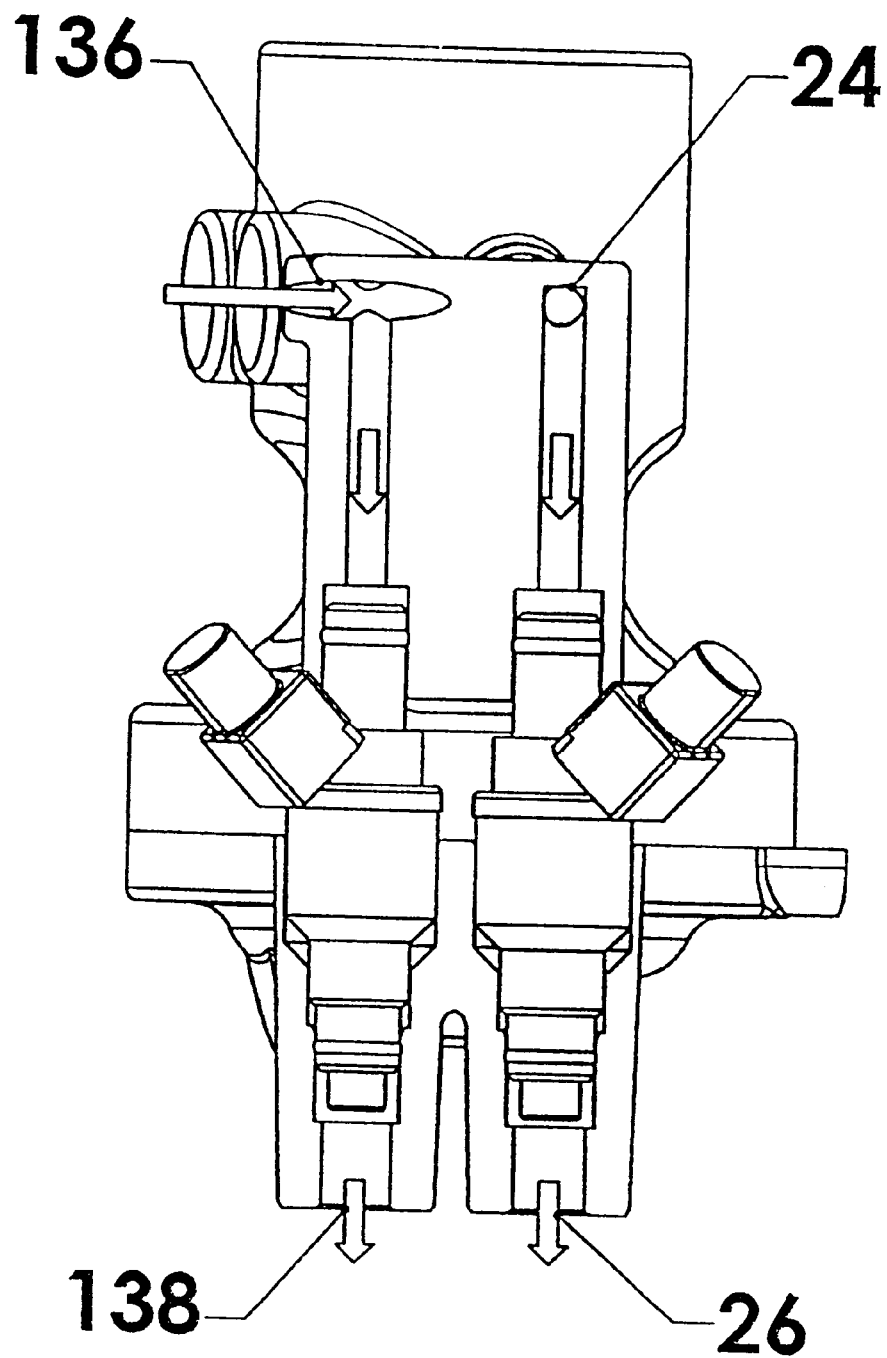
FIG. 12 is a diagram of the metering pod in cross section showing two different flow paths.

Referring to FIG. 12, in an alternate embodiment, in addition, two or more different flow paths may be utilized. The first is a fuel gas, an oxidizer gas, or other with inlet 24 and outlet 26 and the second, inlet 136 with outlet 138 allows the pod to serve a function which meters two items with different flow paths that would enhance combustion and normally not be safe to mix in a single flow path.

In addition to the above, it is preferred that the ECU also have a memory downloadable for service. This would allow for the knowledgeable maintenance of a particular installation. It would also provide information utilizable in altering the programming of that (or another) installation. As an example of the former, injector mistiming might indicate a problem with the input gas. As an example of the latter, abnormal lambda readings might indicate a programming problem overcoming by modifications to provide differing (most likely more accurate) fuel delivery to the mixing unit.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A metering apparatus for metering a compressed combustible gas, the metering apparatus comprising:
   a source of compressed combustible gas;
   a gas powered unit;
   a pod with an inlet passage and an outlet passage, said inlet passage being connected to the source of compressed combustible gas, said outlet passage being connected to the gas powered unit for providing gas to the gas powered unit, and a sealed passage in the pod connecting said inlet passage to said outlet passage;
   a temperature sensor for sensing the temperature of said outlet passage;
   an injector metering device disposed in said sealed passage, said injector metering device having a controllable parameter comprising a temperature of said injector metering device, said injector metering device selectively metering compressed gas from said inlet passage to said outlet passage;
   means to control said controllable parameter, comprising a heater providing heat to the injector metering device to control said controllable parameter responsive to said temperature sensor; and
   temperature control means to control the temperature of the pod.

2. The metering apparatus of claim 1, wherein said temperature control means comprises an electric heater selectively operated to heat the gas in said outlet passage.

3. The metering apparatus of claim 2, wherein the powered unit has an intake manifold and exhaust manifold, and further comprising:
   a pipe between said exhaust manifold and said intake manifold to provide for exhaust gas recirculation.

4. The metering apparatus of claim 2, further comprising a thermal switch located in said pod, and said thermal switch controlling said electric heater.

5. The metering apparatus of claim 1, wherein said temperature control means is operative to control operation of said injector metering device.

6. The metering apparatus of claim 1, wherein said means to control said controllable parameter further comprises an electric heater providing heat to said compressed gas.

7. The metering apparatus of claim 1, further comprising:
   a pressure sensor for sensing the pressure of the compressed gas in said inlet passage; and means to control the metering of said injector metering device in response to said pressure sensor.

8. The metering apparatus of claim 1, further comprising:
a sensor measuring a parameter of the powered unit and generating a parameter output signal representing a measurement of the parameter;
an electronic processing unit receiving said output signal and controlling said injector metering device responsive to said parameter output signal.

9. The metering apparatus of claim 8, wherein said sensor comprises an oxygen sensor disposed in an exhaust of the powered unit.

10. The metering apparatus of claim 1, wherein said outlet passage has an outlet passage axis, said injector metering device has a jet axis, and said jet axis is aligned with said outlet passage axis.

11. The metering apparatus of claim 10, wherein said inlet passage has an inlet passage axis, and said inlet passage axis is substantially perpendicular to said jet axis.

12. The metering apparatus of claim 1, wherein said pod is remote from the gas powered unit, and further comprising a pipe connecting said outlet passage of said pod to the powered unit.

13. The metering apparatus of claim 1, further comprising a pressure regulator connected to said sealed passage for regulating the compressed gas.

14. The metering apparatus of claim 1, wherein the source of the compressed combustible gas comprises a tank, and the pod is mounted directly to and external to the tank.

15. The metering apparatus of claim 1, wherein the source of the compressed combustible gas comprises a tank, and the pod is mounted directly to and internal to the tank.

16. The metering apparatus of claim 1, wherein the said inlet, outlet and sealed passages comprise a first flow path, and further comprising a second flow path separate from said first flow path, and including a second inlet and a second outlet.

17. The metering apparatus of claim 1, wherein the pod has the ability to meter two different fluids in two separate flow paths, with the separate flow paths combined in the pod.

18. The metering apparatus of claim 1, wherein the pod has more than two flow separate paths for metering more than two different fluids.

19. A metering apparatus for metering a compressed combustible gas, the metering apparatus comprising:
a source of compressed combustible gas;
a gas powered unit having an intake manifold and exhaust manifold;
a pipe between said exhaust manifold and said intake manifold to provide for exhaust gas recirculation;
a unit temperature sensor for sensing a measure reflective of the metering of the gas in the intake manifold; and
means to control the exhaust gas recirculation responsive to said unit temperature sensor;
a pod with an inlet passage and an outlet passage, said inlet passage being connected to the source of compressed combustible gas, said outlet passage being connected to the gas powered unit for providing gas to the gas powered unit, and a sealed passage in the pod connecting said inlet passage to said outlet passage;
an injector metering device disposed in said sealed passage, said injector metering device selectively metering compressed gas from said inlet passage to said outlet passage; and
temperature control means to control the temperature of the pod.

20. The metering apparatus of claim 19, further comprising an air mixing unit disposed between the pod and said intake manifold.

21. The metering apparatus of claim 19, further comprising:
a sensor measuring a parameter of the powered unit and generating a parameter output signal representing a measurement of the parameter;
an electronic processing unit receiving said output signal and controlling said injector metering device responsive to said parameter output signal; and
an exhaust gas recirculation valve for controlling said exhaust gas recirculation, and wherein said sensor controls said exhaust gas recirculation valve.

22. The metering apparatus of claim 21, further comprising an adjustable mechanical manual control of the exhaust gas recirculation valve.

23. A metering apparatus for metering a compressed combustible gas, the metering apparatus comprising:
a source of compressed combustible gas;
a gas powered unit;
a pod with an inlet passage and an outlet passage, said inlet passage being connected to the source of compressed combustible gas, said outlet passage being connected to the gas powered unit for providing gas to the gas powered unit, and a sealed passage in the pod connecting said inlet passage to said outlet passage;
an injector metering device disposed in said sealed passage, said injector metering device selectively metering compressed gas from said inlet passage to said outlet passage;
temperature control means to control the temperature of the pod; and
means for heating gas in said outlet passage, and wherein said sealed passage, said injector metering device and said means for heating are integrated into said pod.

24. A metering apparatus for metering a compressed combustible gas, the metering apparatus comprising:
a source of compressed combustible gas;
a gas powered unit;
a pod with an inlet passage and an outlet passage, said inlet passage being connected to the source of compressed combustible gas, said outlet passage being connected to the gas powered unit for providing gas to the gas powered unit, and a sealed passage in the pod connecting said inlet passage to said outlet passage;
an injector metering device disposed in said sealed passage, said injector metering device selectively metering compressed gas from said inlet passage to said outlet passage;
temperature control means to control the temperature of the pod; and
a filter disposed in said sealed passage of said pod between said inlet passage and said injector metering device.

25. The metering apparatus of claim 24, further comprising a positive lock out valve disposed in the flow path of the gas after the filter and before the injector metering device.

26. A metering apparatus for a liquid compressed combustible gas, the metering unit comprising:
a source of liquid compressed combustible gas;
a gas powered unit having an intake manifold and exhaust manifold;
a pipe between said exhaust manifold and said intake manifold to provide for exhaust gas recirculation;

a unit temperature sensor for sensing a measure reflective of the metering of the gas in the intake manifold; and means to control the amount of exhaust gas recirculation in response to said unit temperature sensor;

a pod with an inlet passage and an outlet passage, a sealed passage in the pod connecting said inlet passage to said outlet passage, said pod being remote from the gas powered unit, and a pipe connecting said outlet passage of said pod to the powered unit, said inlet passage being connected to the source of compressed liquid combustible gas, and said outlet passage being connected to the gas powered unit for providing gas to the gas powered unit; and an injector metering device disposed in said sealed passage, said injector metering device selectively metering compressed gas from said inlet passage to said outlet passage to vaporize the liquid compressed combustible gas into a gas.

27. The metering apparatus of claim 26, further comprising an electric heater selectively operable to heat the gas in said outlet passage.

28. The metering apparatus of claim 26, wherein the powered unit comprises an exhaust and a mixing unit, and further comprising an exhaust gas recirculation passage extending between the exhaust and the mixing unit.

29. The metering apparatus of claim 28, further comprising means to control the exhaust gas recirculation passage.

30. The metering apparatus of claim 26, further comprising temperature control means for controlling a temperature of the pod.

31. The metering apparatus of claim 26, wherein the unit has a controllable parameter, and further comprising:

a temperature sensor for sensing a temperature of said outlet passage and generating a sensed temperature output signal; and control means connected to said temperature sensor to control said controllable parameter in response to said sensed temperature output signal.

32. The metering apparatus of claim 31, wherein said control means comprises a heater providing heat to said outlet passage.

33. The metering apparatus of claim 31, wherein said control means comprises a means to cool said compressed exhaust gas.

34. The metering apparatus of claim 26, further comprising:

a sensor measuring a parameter of the powered unit and generating a parameter output signal representing a measurement of the parameter; and an electronic processing unit receiving said output signal and controlling said injector metering device responsive to said parameter output signal.

35. A metering apparatus for metering a liquid compressed combustible gas, the metering unit comprising:

a source of liquid compressed combustible gas;

a gas powered unit having an exhaust and an air mixing unit;

a pod with an inlet passage and an outlet passage, a sealed passage in the pod connecting said inlet passage to said outlet passage, wherein said pod is remote from the gas powered unit, a pipe connecting said outlet passage of said pod to the air mixing unit of the powered unit, said inlet passage being connected to the source of compressed liquid combustible gas, and said outlet passage being connected to the gas powered unit for providing gas to the gas powered unit;

an injector metering device disposed in said sealed passage, said injector metering device selectively metering compressed gas from said inlet passage to said outlet passage to vaporize the liquid compressed combustible gas into a gas;

an exhaust gas recirculation passage connecting the exhaust to the air mixing unit; and a unit temperature sensor for sensing a measure reflective of the metering of the gas in the intake manifold; and means to control the exhaust gas recirculation in response to said unit temperature sensor.

36. The metering apparatus of claim 35, further comprising an electric heater selectively operable to heat the gas in said outlet passage.

37. A metering apparatus for metering a liquid compressed combustible gas, the metering unit comprising:

a source of liquid compressed combustible gas;

a pas powered unit having an exhaust and an air mixing unit;

a pod with an inlet passage and an outlet passage, a sealed passage in the pod connecting said inlet passage to said outlet passage, wherein said pod is remote from the gas powered unit, a pipe connecting said outlet passage of said pod to the air mixing unit of the powered unit, said inlet passage being connected to the source of compressed liquid combustible gas, and said outlet passage being connected to the gas powered unit for providing gas to the gas powered unit;

an injector metering device disposed in said sealed passage, said injector metering device selectively metering compressed gas from said inlet passage to said outlet passage to vaporize the liquid compressed combustible gas into a gas;

an exhaust gas recirculation passage connecting the exhaust to the air mixing unit;

a temperature sensor for sensing a temperature of said outlet passage and generating a sensed temperature output signal; and a heater connected to said outlet passage and receiving said sensed temperature output signal from said temperature sensor, said heater providing heat to said outlet passage to control said controllable parameter in response to said sensed temperature output signal.

38. A metering apparatus for metering a compressed combustible gas, the metering unit comprising:

a source of liquid compressed combustible gas;

a gas powered unit having an exhaust, an intake, and an air mixing unit;

a pod with an inlet passage and an outlet passage, a sealed passage in the pod connecting said inlet passage to said outlet passage, said pod being remote from the gas powered unit, a pipe connecting said outlet passage of said pod to the air mixing unit of the powered unit, said inlet passage connected to the source of compressed combustible gas, and said outlet passage connected to the gas powered unit for providing gas to the gas powered unit;

an injector metering device disposed in said sealed passage, said injector metering device selectively metering compressed gas from said inlet passage to said outlet passage to vaporize any left over liquid compressed combustible gas into a gas;

an electric heater connected to said pod;

a thermal switch connected to said pod, said thermal switch selectively operating said electric heater to heat the gas;

an exhaust gas recirculation passage extending between the exhaust and the intake to provide for exhaust gas recirculation;

a unit temperature sensor for sensing a measure reflective of the metering of the gas in the intake manifold; and means to control the amounts of exhaust gas recirculation in response to said unit temperature sensor.

39. The metering apparatus of claim 38, further comprising:

a sensor measuring a parameter of the powered unit and generating a parameter output signal representing a measurement of the parameter; and an electronic processing unit receiving said output signal and controlling said injector metering device and said exhaust gas recirculation passage responsive to said parameter output signal.

40. The metering apparatus of claim 38, wherein said sealed passage, said injector and said electric heater are integrated into said pod.

41. The metering apparatus of claim 38, further comprising a pressure regulator connected to said sealed passage for regulating the compressed gas.

42. The metering apparatus of claim 38, further comprising a filter disposed in said sealed passage of said pod between said inlet passage and said injector metering device.

43. The metering apparatus of claim 38, further comprising a thermal switch located in said pod, and said thermal switch controlling said electric heater.

44. A metering apparatus for a compressed combustible gas, comprising:

a source of compressed combustible gas;

a gas powered unit;

a pod with an inlet passage and an outlet passage, a sealed passage in the pod connecting said inlet passage to said outlet passage, said pod being remote from the gas powered unit, a pipe connecting said outlet passage of said pod to the air mixing unit of the powered unit, said inlet passage being connected to the source of compressed combustible gas, and said outlet passage being connected to the gas powered unit for providing gas to the gas powered unit;

an injector metering device disposed in said sealed passage, said injector metering device selectively metering compressed gas from said inlet passage to said outlet passage to vaporize any left over liquid compressed combustible gas into a gas;

an electric heater connected to said outlet passage of said pod;

a thermal switch connected to said pod, said thermal switch selectively operating said electric heater to heat the gas in said outlet passage; and a pipe connecting said outlet passage of said pod to the powered unit.

45. The metering apparatus of claim 44, wherein the unit has a controllable parameter and further comprising:

a temperature sensor for sensing a temperature of said outlet passage and generating a sensed temperature output signal; and control means connected to said temperature sensor to control said controllable parameter in response to said sensed temperature output signal.

46. The metering apparatus of claim 45, further comprising:

a sensor measuring a parameter of the powered unit and generating a parameter output signal representing a measurement of the parameter; and an electronic processing unit receiving said output signal and controlling said injector metering device responsive to said parameter output signal.

\* \* \* \* \*